US010102256B2

(12) United States Patent
Barron et al.

(10) Patent No.: US 10,102,256 B2
(45) Date of Patent: Oct. 16, 2018

(54) INTERNET SEARCH RESULT INTENTION

(71) Applicant: INTERNATIONAL BUSINESS MACHINES CORPORATION, Armonk, NY (US)

(72) Inventors: Gilbert Barron, South Salem, NY (US); Jasmine S. Basrai, Fremont, CA (US); Michael J. Bordash, Newtown, CT (US); Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 15/280,131

(22) Filed: Sep. 29, 2016

(65) Prior Publication Data
US 2018/0089197 A1    Mar. 29, 2018

(51) Int. Cl.
*G06F 17/30* (2006.01)
(52) U.S. Cl.
CPC ...... *G06F 17/3053* (2013.01); *G06F 17/3043* (2013.01); *G06F 17/30554* (2013.01); *G06F 17/30598* (2013.01); *G06F 17/30663* (2013.01); *G06F 17/30705* (2013.01)
(58) Field of Classification Search
CPC ............. G06F 17/3053; G06F 17/3043; G06F 17/30554; G06F 17/30598; G06F 17/30663; G06F 17/30705
USPC ........................................................ 707/723
See application file for complete search history.

(56) References Cited

U.S. PATENT DOCUMENTS

| | | | | |
|---|---|---|---|---|
| 5,371,807 | A * | 12/1994 | Register | ............ G06F 17/30707 382/159 |
| 8,407,229 | B2 | 3/2013 | Yang et al. | |
| 8,856,114 | B2 | 10/2014 | Azar et al. | |
| 9,208,236 | B2 | 12/2015 | Nagaralu et al. | |
| 9,262,528 | B2 | 2/2016 | Cooper et al. | |
| 2010/0228693 | A1 * | 9/2010 | Dawson | .............. G06F 17/2705 706/12 |
| 2012/0303356 | A1 * | 11/2012 | Boyle | ................ G06F 17/30672 704/9 |
| 2014/0040274 | A1 * | 2/2014 | Aravamudan | .... G06F 17/30386 707/741 |
| 2014/0379326 | A1 * | 12/2014 | Sarikaya | ................. G10L 15/18 704/9 |

(Continued)

*Primary Examiner* — Rehana Perveen
*Assistant Examiner* — Hicham Skhoun
(74) *Attorney, Agent, or Firm* — Schmeiser, Olsen & Watts; Isaac J. Gooshaw

(57) ABSTRACT

A method and system for improving an Internet based search is provided. The method includes generating an intent domain associated with a subject based intent classification. An unstructured data analysis process is executed with respect to a content corpus being associated with the subject based intent classification and a search phase entered in a search field of a graphical user interface with respect to a domain specific search query for specified subject matter. In response the subject based intent classification is determined to be associated with the search query and the subject based intent classification is compared to search results data. A subset of search results of the search results data correlating to the subject based intent classification is determined and ranked resulting in a ranked list. The subject based intent classification and the ranked list are presented to a user.

17 Claims, 5 Drawing Sheets

(56) References Cited

U.S. PATENT DOCUMENTS

| | | | |
|---|---|---|---|
| 2015/0193447 A1* | 7/2015 | Voinea | G06F 17/3064 707/767 |
| 2016/0063096 A1* | 3/2016 | Bostick | G06F 17/30687 707/728 |
| 2016/0117360 A1* | 4/2016 | Kunc | G06F 17/30401 707/730 |

* cited by examiner

US 10,102,256 B2

INTERNET SEARCH RESULT INTENTION

FIELD

The present invention relates generally to a method for implementing a search query ranking process and in particular to a method and associated system for improving computer search query technology by identifying a user query intent and correlating the user query intent with search results.

BACKGROUND

Accurately selecting search parameters based on input from a user typically includes an inaccurate process with little flexibility. Analyzing current search result parameters with respect various attributes may include a complicated process that may be time consuming and require a large amount of resources. Accordingly, there exists a need in the art to overcome at least some of the deficiencies and limitations described herein above.

SUMMARY

A first aspect of the invention provides an Internet search improvement method comprising: generating, by a processor enabling a natural language classifier (NLC) circuit, an intent domain associated with at least one subject based intent classification; executing, by the processor enabling the NLC circuit, an unstructured data analysis process with respect to a content corpus being associated with the at least one subject based intent classification; analyzing, by a processor enabling the NLC circuit, a search phase entered in a search field of a graphical user interface with respect to a domain specific search query for specified subject matter; determining, by the processor executing the NLC circuit with respect to results of the analyzing, that the at least one subject based intent classification is associated with the search query; comparing, by the processor, the at least one subject based intent classification to search results data of a search results data repository; generating, by the processor based on results of the determining and comparing, a subset of search results of the search results data, wherein the subset of search results correlates to the at least one subject based intent classification; ranking, by the processor, the subset of search results resulting in a ranked list of the subset of search results; and presenting, by the processor, the at least one subject based intent classification and the ranked list.

A second aspect of the invention provides a computer program product, comprising a computer readable hardware storage device storing a computer readable program code, the computer readable program code comprising an algorithm that when executed by a processor of a hardware device implements an Internet search improvement method, the method comprising: generating, by the processor enabling a natural language classifier (NLC) circuit of the hardware device, an intent domain associated with at least one subject based intent classification; executing, by the processor enabling the NLC circuit, an unstructured data analysis process with respect to a content corpus being associated with the at least one subject based intent classification; analyzing, by a processor enabling the NLC circuit, a search phase entered in a search field of a graphical user interface with respect to a domain specific search query for specified subject matter; determining, by the processor executing the NLC circuit with respect to results of the analyzing, that the at least one subject based intent classification is associated with the search query; comparing, by the processor, the at least one subject based intent classification to search results data of a search results data repository; generating, by the processor based on results of the determining and comparing, a subset of search results of the search results data, wherein the subset of search results correlates to the at least one subject based intent classification; ranking, by the processor, the subset of search results resulting in a ranked list of the subset of search results; and presenting, by the processor, the at least one subject based intent classification and the ranked list.

A third aspect of the invention provides a hardware device comprising a processor coupled to a computer-readable memory unit, the memory unit comprising instructions that when executed by the processor executes an Internet search improvement method comprising: generating, by the processor enabling a natural language classifier (NLC) circuit of the hardware device, an intent domain associated with at least one subject based intent classification; executing, by the processor enabling the NLC circuit, an unstructured data analysis process with respect to a content corpus being associated with the at least one subject based intent classification; analyzing, by a processor enabling the NLC circuit, a search phase entered in a search field of a graphical user interface with respect to a domain specific search query for specified subject matter; determining, by the processor executing the NLC circuit with respect to results of the analyzing, that the at least one subject based intent classification is associated with the search query; comparing, by the processor, the at least one subject based intent classification to search results data of a search results data repository; generating, by the processor based on results of the determining and comparing, a subset of search results of the search results data, wherein the subset of search results correlates to the at least one subject based intent classification; ranking, by the processor, the subset of search results resulting in a ranked list of the subset of search results; and presenting, by the processor, the at least one subject based intent classification and the ranked list.

The present invention advantageously provides a simple method and associated system capable of accurately selecting search parameters based on input from a user.

DETAILED DESCRIPTION

Figure 1:
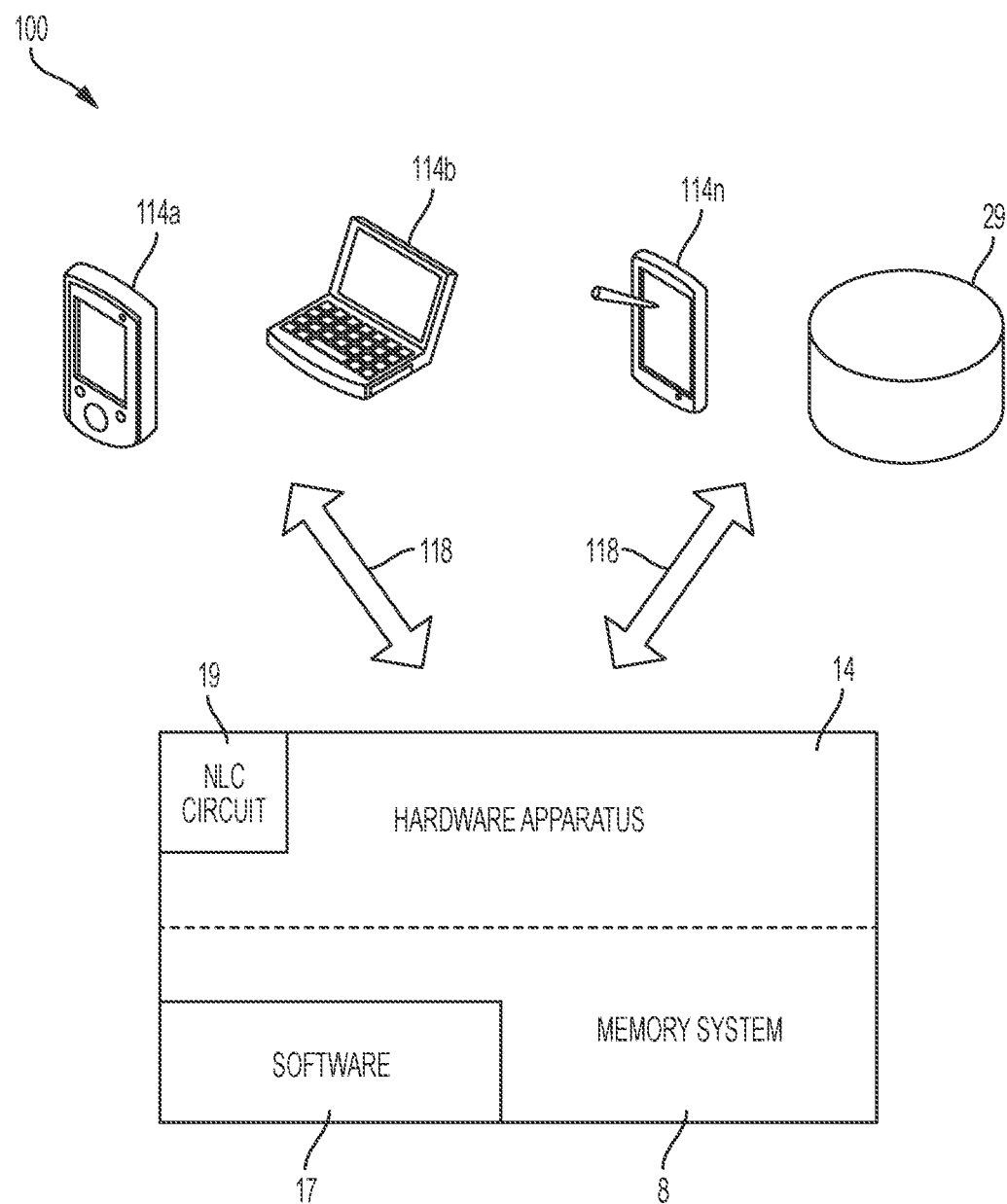
FIG. 1 illustrates a system for improving computer search query technology by correlating user query intent with Internet search results, in accordance with embodiments of the present invention.

FIG. 1 illustrates a system 100 for improving computer search query technology by correlating user query intent with Internet search results, in accordance with embodiments of the present invention. System 100 enables a process for providing search results for a user query based on correlation between search results and user query intent. The user query intent is identified via execution of a natural language analysis with respect to the user query. In response, a subset of the search results correlating to a type of query intent above a specified threshold is presented to a user. Intent is defined herein as an aim or purpose with respect to a subject associated with a user search query. The correlation process is executed by analyzing indicators associated with an intent of a search query and predicting associated search results. The analysis includes enabling a natural language classifier (NLC) circuit 19 to execute a semantic search and generate an intent domain associated with a subject based intent classification and execute an unstructured data analysis process with respect to a content corpus associated with the subject based intent classification. A semantic search improves a search accuracy by understanding a user's intent in combination with a contextual meaning of terms as they appear within a searchable dataspace (e.g., the Internet, a closed system, etc.) to generate more relevant results. Semantic search systems consider various points including context of search, location, intent, variation of words, synonyms, generalized and specialized queries, concept matching, natural language queries, etc. to provide relevant search results. A subset of search results associated with the subject based intent classification is generated and ranked. NLC circuit 19 applies deep learning techniques for predicting "best" predefined classes or categories associated with short input sentences or phrases. The classes or categories may trigger a corresponding action with respect to an application such as, inter alia, directing a request to a location or person, answering a question, etc. After the deep learning techniques have completed execution, NLC circuit 19 returns information associated with unknown text and a response may include the name for top classes and confidence values.

System 100 of FIG. 1 includes hardware devices 114a . . . 114n and an intent data repository 29 in communication with a hardware apparatus 14 via a network 118. Hardware devices 114a . . . 114n and hardware apparatus 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, hardware devices 114a . . . 114n and hardware apparatus 14 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit such as a natural language classifier (NLC) circuit 19 (as described, infra) designed for only implementing an automated process for determining an intent associated with a search query and correlating user query intent with Internet search results. Hardware apparatus 14 includes a memory system 8, software 17, and NLC circuit 19. The memory system 8 (e.g., a database) and intent data repository 29 may each include a single memory system. Alternatively, the memory system 8 and intent data repository 29 may each include a plurality of memory systems. Hardware devices 114a . . . 114n may comprise any type of hardware devices (comprising embedded circuitry for only performing an automated process for determining an intent associated with a search query and correlating user query intent with Internet search results) including, inter alia, a smart phone, a PDA, a tablet computer, a laptop computer, etc.

System 100 of FIG. 1 enables a process for determining a query based intent associated with a search query as follows:

During a process for enabling a natural language search (initiated by a user) at a domain, an application programming interface (API) for deriving an intent of the user (e.g., via natural language classifiers (NLC)) is applied with respect to a natural language search phrase entered in a search application GUI. For example, the intent may be determined with respect to the natural language search phrase being directed toward products, support, or content classifications, as defined within a ground truth (i.e., information provided by direct observation) for the domain. If an intent is not determined via the natural language search, a standard set of relevant options (i.e., with respect to past searches) retrieved from a result repository may be returned. If an intent is determined via the natural language search, a tailored result is generated based on an intent classification(s) and a standard set of results from a result repository comprising results from previous search queries. The tailored result is subsequently presented to the user via a specialized circuit and GUI. For example, if a user wishes to locate help with respect to repairing a bicycle tire and begins to type the phrase "How do I fix a bike", a natural language classification process is continuously executed with respect to the search query resulting in an intent of "support" being determined to be closely correlated within a ground truth for the domain. The intent of "support" is determined because the natural language classifier's cognitive matching capabilities resulted in completed matches (with respect to a high confidence value) with respect to all possible detected patterns in the natural language search query. Examples of the detected patterns may include, inter alia, the following phrases: "how do I", "I fix", "a bike", etc. such that all lend of the aforementioned detected patterns provide evidence with respect to the detected intent of "support". Furthermore, many additional intent phrases such as "cycling" or "consumables" could have been detected based on the detected patterns. A standard set of results may be generated if no viable intent(s) is detected via execution of the natural language search query thereby yielding a standard set of results. As more intent phrases are inferred from the query, additional context associated with a subset of results more relevant to the user is received. Therefore, system 100 refines results (with respect to intent) based on the specific intent(s) of the user thereby yielding a tailored list results for the entered search query provided to the user. For example (in this instance), a selection entitled "How do I patch a bicycle tire?" enables system 100 to respond with alternative word or phrases (differing from originally entered text) such that an actual intent phrase is determined.

System 100 of FIG. 1 additionally provides a ground truth including domain provided resources classified by products, support and content items. Each of the products, support and content items are tagged for relevancy such that when a user enters a natural language search via the domain, NLCs are applied to determine an intent associated with a natural language search phrase within a search application. In response, a result comprising a corresponding intent classification and associated confidence levels are returned. If an intent is unable to be determined from the search, standard search results are returned. If an intent is able to be determined from the user's search, a retrieve and rank process is executed via usage of Website resources/classifiers, associated relevancy tags, and intent classification with associated confidence levels for producing a superior ranked search result. For example (in this instance), if a user enters a search for "How do I fix a flat tire" and the intent is determined to closely correlate with the "support" category in the ground truth, the search results returned to the user will comprise a ranked result provided by items within the "support" category.

Figure 2:
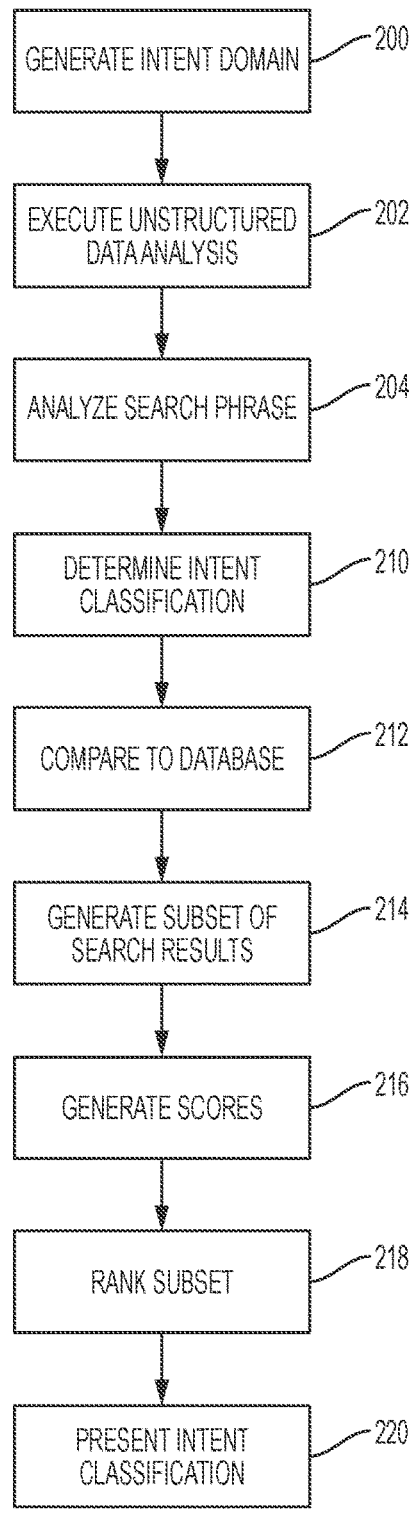
FIG. 2 illustrates an algorithm detailing a process flow enabled by the system of FIG. 1 for improving computer search query technology by correlating user query intent with Internet search results, in accordance with embodiments of the present invention.

FIG. 2 illustrates an algorithm detailing a process flow enabled by system 100 of FIG. 1 for improving computer search query technology by correlating user query intent with Internet search results, in accordance with embodiments of the present invention. Each of the steps in the algorithm of FIG. 2 may be enabled and executed in any order by a computer processor(s) or any type of specialized hardware executing specialized computer code. In step 200, an intent domain associated with a subject based intent classification(s) is generated via execution of an NLC circuit. In step 202, an unstructured data analysis process is executed with respect to a content corpus being associated with the subject based intent classification. The unstructured data analysis may include, inter alia, a keyword extraction process, an image extraction process, a personality extraction process, a tone extraction process, a relationship extraction process, etc.

The query may be associated with a specified domain specific corpus with respect to the content corpus. In step 204, a search phase entered in a search field of a graphical user interface with respect to a domain specific search query for specified subject matter is analyzed. The analysis may include: matching keywords, matching a high frequency of keywords and associated tags, matching words illustrated within headings, matching results of a comparison process with respect to additional content, etc. In step 210, it is determined (based on the analysis of step 204) that the subject based intent classification is associated with the search query. In step 212, the subject based intent classification is compared to search results data of a search results data repository. In step 214, a subset of search results of the search results data is generated based on results of steps 210 and 212. The subset of search results correlates to the subject based intent classification. In step 216, confidence scores associated with confidence factors with respect to the subject based intent classification are generated. In step 218, the subset of search results is ranked (based on the confidence scores) resulting in a ranked list of the subset of search results. In step 220, the subject based intent classification and ranked list are presented to the user.

Figure 3A:
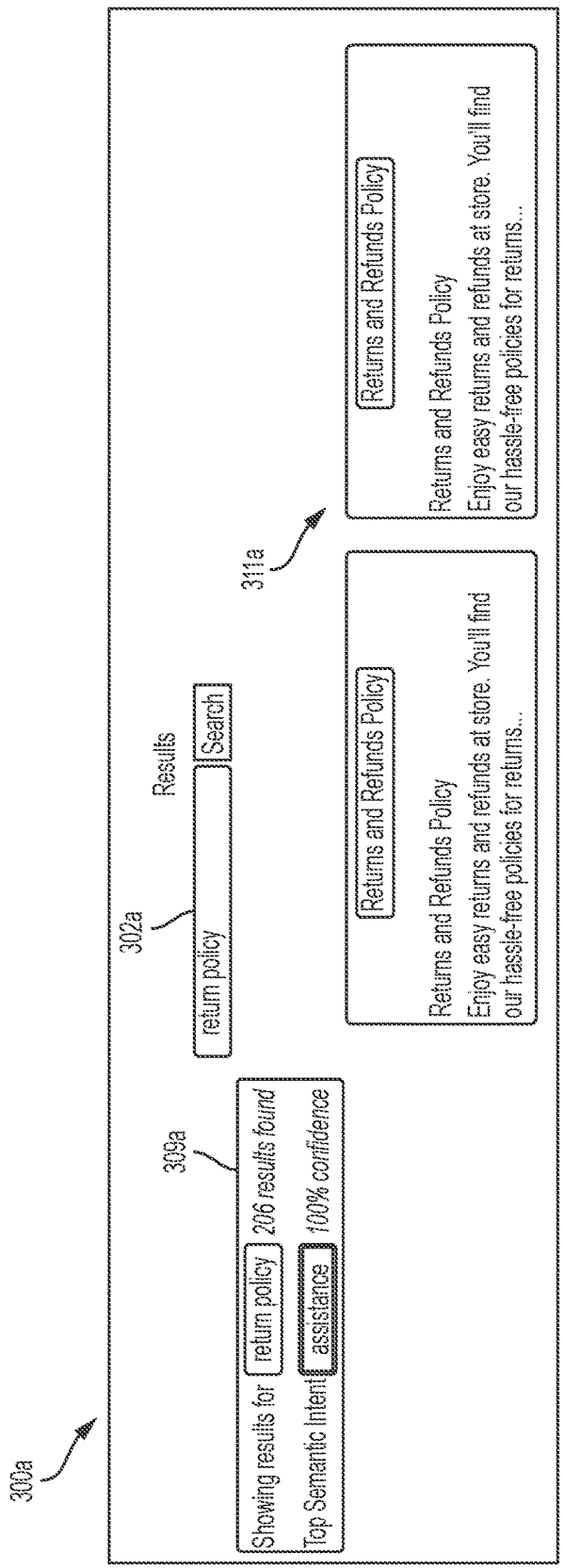
FIG. 3A illustrates a screen shot of a user interface enabled by the system of FIG. 1 for specifying a top semantic intent comprising a 100% confidence level, in accordance with embodiments of the present invention.

FIG. 3A illustrates a screen shot of a user interface 300a enabled by system 100 of FIG. 1 for improving computer search query technology by correlating user query intent with Internet search results, in accordance with embodiments of the present invention. User interface 300a comprises a results field 302a comprising search query results for the phrase "return policy". In response, system 100 presents results 311a specifying a top semantic intent for "assistance" comprising a 100% confidence level.

Figure 3B:
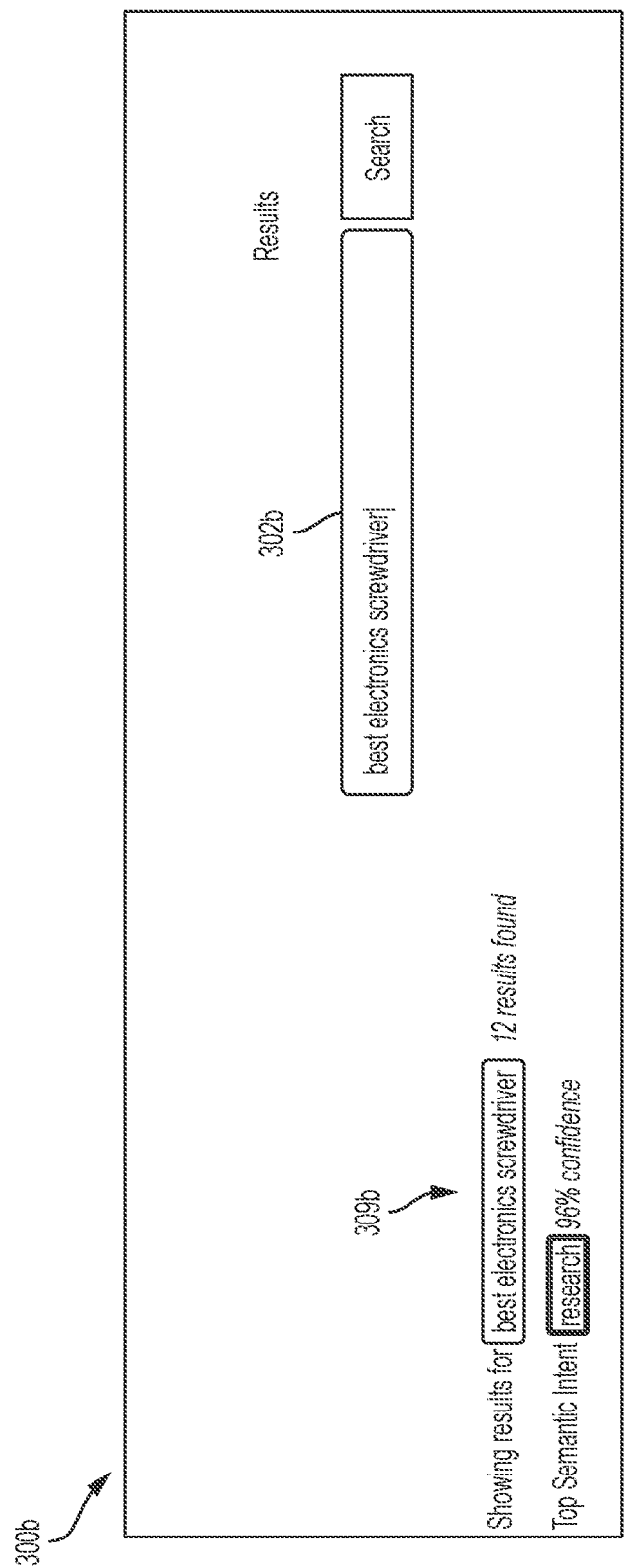
FIG. 3B illustrates a screen shot of a user interface enabled by the system of FIG. 1 for specifying a top semantic intent comprising a 96% confidence level, in accordance with embodiments of the present invention.

FIG. 3B illustrates a screen shot of a user interface 300b enabled by system 100 of FIG. 1 for improving computer search query technology by correlating user query intent with Internet search results, in accordance with embodiments of the present invention. User interface 300b comprises a results field 302b comprising search query results for the phrase "best electronics screwdriver". In response, system 100 presents results specifying a top semantic intent "research" comprising a 96% confidence level.

Figure 4:
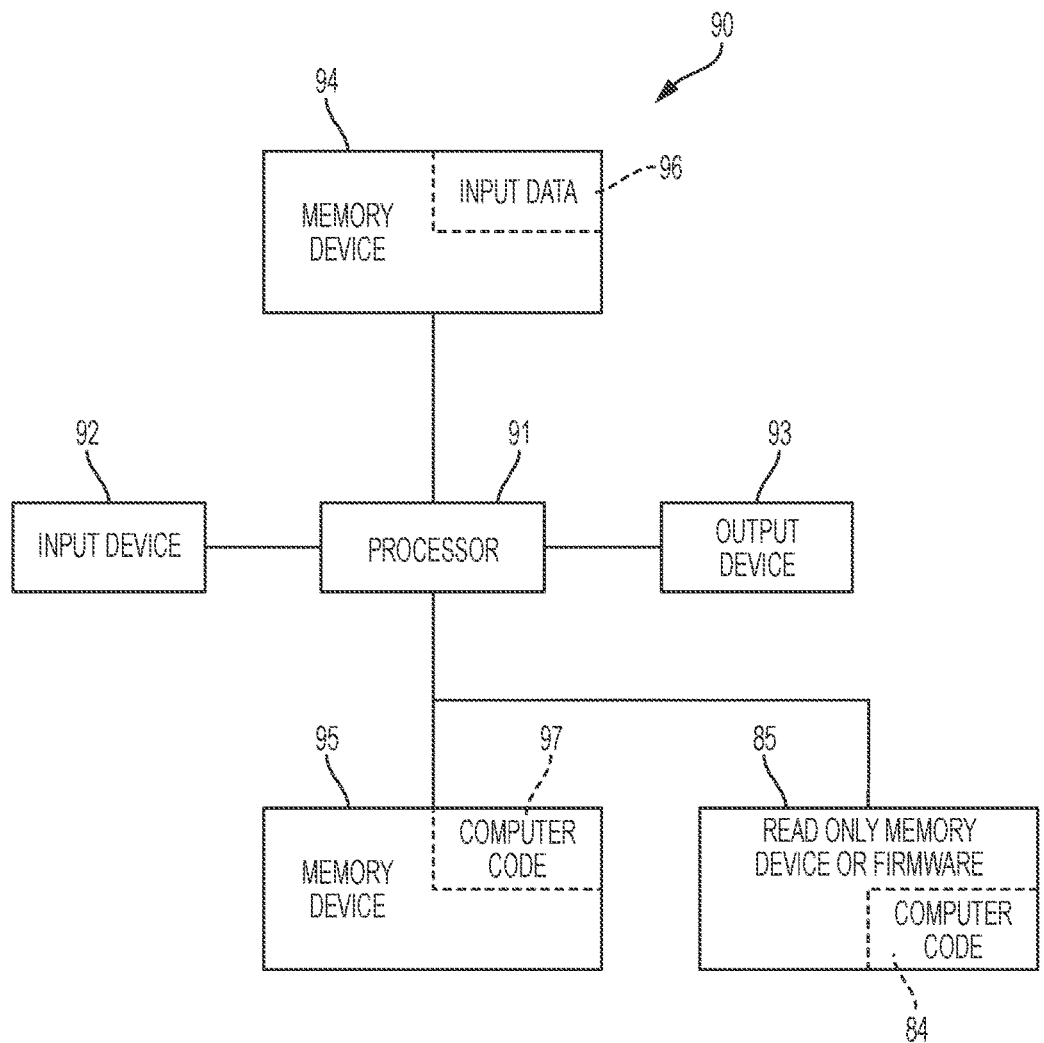
FIG. 4 illustrates a computer system used by the system of FIG. 1 for enabling a process for improving computer search query technology by correlating user query intent with Internet search results, in accordance with embodiments of the present invention.

FIG. 4 illustrates a computer system 90 (e.g., hardware devices 114a . . . 114n and hardware apparatus 14) used by or comprised by the system of FIG. 1 for improving computer search query technology by correlating user query intent with Internet search results, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for enabling a process for improving computer search query technology by correlating user query intent with Internet search results. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 2) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for improving computer search query technology by correlating user query intent with Internet search results. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving computer search query technology by correlating user query intent with Internet search results. In another embodiment, the invention provides a business method that performs the process steps of the invention on a subscription, advertising, and/or fee basis. That is, a service supplier, such as a Solution Integrator, could offer to enable a process for improving computer search query technology by correlating user query intent with Internet search results. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An Internet search query technology improvement method comprising:

generating, by a processor enabling a natural language classifier (NLC) circuit of a specialized hardware device comprising special purpose hardware and computer instructions, an intent domain associated with at least one subject based intent classification, wherein said at least one subject based intent classification is defined within a ground truth for said intent domain, and wherein said NLC circuit comprises embedded specialized non-generic analog, digital, and logic based circuitry of said specialized hardware device for executing specialized software for only performing said Internet search query technology improvement method;

tagging, by said processor, said at least one subject based intent classification with respect to a relevancy associated with said intent domain;

continuously executing, by said processor enabling said NLC circuit, an unstructured data analysis process with respect to a content corpus being associated with said at least one subject based intent classification, wherein said unstructured data analysis process comprises an extraction process consisting of a keyword extraction process, an image extraction process, a personality extraction process, a tone extraction process, and a relationship extraction process;

analyzing, by a processor enabling said NLC circuit, a search phase entered in a search field of a first graphical user interface with respect to a domain specific search query for specified subject matter;

presenting, by said processor via said first graphical user interface, said search phrase and an associated number of results in a first results portion of said first graphical user interface, first results specifying a top sematic intent and an associated confidence percentage level in a second results portion of said first graphical user interface, and a policy statement associated with said search phrase in a third portion of said first graphical user interface;

determining, by said processor executing said NLC circuit with respect to results of said analyzing, that said at least one subject based intent classification is associated with said search query;

comparing, by said processor, said at least one subject based intent classification to search results data of a search results data repository;

generating, by said processor based on results of said determining and comparing, a subset of search results of said search results data, wherein said subset of search results correlates to said at least one subject based intent classification exceeding a specified threshold, and wherein said subset of search results is generated with respect to a context of said domain specific search query, a location of said domain specific search query, said at least one subject based intent classification, a variation of words of said domain specific search query, synonyms of said domain specific search query, concept matching results of said domain specific search query, and natural language queries associated with said domain specific search query;

ranking, by said processor, said subset of search results resulting in a ranked list of said subset of search results, said subset of search results comprising alternative words and phrases differing from any words and phrases of said search phrase, wherein said generating said subset and said ranking results in an improvement of Internet based search accuracy by understanding user intent in combination with a contextual meaning of terms as they appear within a searchable Internet data space for generation of more relevant Internet search results;

triggering, by said processor based on said at least one subject based intent classification, an action enabling a request to be directed to a specified Internet location;

presenting, by said processor via a second graphical user interface, a specified search phrase of said search phrases in a first results portion of said second graphical user interface, said specified search phrase and an associated number of results in a second results portion of said second graphical user interface, and results specifying a top sematic intent and an associated confidence percentage level in a third results portion of said second graphical user interface, wherein said first results portion differs from said second results portion and said third results portion; and deploying, integrating, and maintaining, by said computer processor based on execution of firmware instructions with respect to said Internet search query technology improvement method, said specialized hardware device comprising said NLC circuit including a programmable logic array configured to execute specialized software for personalizing said NLC circuit thereby resulting in a performance of said special purpose hardware system being configured for improving said Internet based search accuracy for execution of said Internet search query technology improvement method.

2. The method of claim 1, further comprising:
generating, by said processor based on results of said determining and comparing, confidence scores associated with confidence factors with respect to said at least one subject based intent classification, wherein said ranking is further based on said confidence scores.

3. The method of claim 2, wherein said presenting further comprises presenting said confidence scores with said ranking list.

4. The method of claim 1, wherein said query is associated with a specified domain specific corpus with respect to said content corpus.

5. The method of claim 1, wherein said generating said Intent domain comprises:
analyzing said content corpus; and
determining similarities within said content corpus.

6. The method of claim 1, wherein said analyzing comprises:
matching keywords;
matching a high frequency of keywords and associated tags;
matching words illustrated within headings; and
matching results of a comparison process with respect to additional content.

7. The method of claim 1, further comprising:
providing at least one support service for at least one of creating, integrating, hosting, maintaining, and deploying computer-readable code in the hardware device, said code being executed by the computer processor to implement: said generating said intent domain, said executing, said analyzing, said determining, said comparing, said generating said subset, said ranking, and said presenting.

8. A computer program product, comprising a computer readable hardware storage device storing a computer readable program code, said computer readable program code comprising an algorithm that when executed by a processor of a hardware device implements an Internet search query technology improvement method, said method comprising:
generating, by said processor enabling a natural language classifier (NLC) circuit of a specialized hardware device comprising special purpose hardware and computer instructions, an intent domain associated with at least one subject based intent classification, wherein said at least one subject based intent classification is defined within a ground truth for said intent domain, and wherein said NLC circuit comprises embedded specialized non-generic analog, digital, and logic based circuitry of said specialized hardware device for executing specialized software for only performing said Internet search query technology improvement method;
tagging, by said processor, said at least one subject based intent classification with respect to a relevancy associated with said intent domain;
continuously executing, by said processor enabling said NLC circuit, an unstructured data analysis process with respect to a content corpus being associated with said at least one subject based intent classification, wherein said unstructured data analysis process comprises an extraction process consisting of a keyword extraction process, an image extraction process, a personality extraction process, a tone extraction process, and a relationship extraction process;
analyzing, by a processor enabling said NLC circuit, a search phase entered in a search field of a first graphical user interface with respect to a domain specific search query for specified subject matter;
presenting, by said processor via said first graphical user interface, said search phrase and an associated number of results in a first results portion of said first graphical user interface, first results specifying a top sematic intent and an associated confidence percentage level in a second results portion of said first graphical user interface, and a policy statement associated with said search phrase in a third portion of said first graphical user interface;
determining, by said processor executing said NLC circuit with respect to results of said analyzing, that said at least one subject based intent classification is associated with said search query;
comparing, by said processor, said at least one subject based intent classification to search results data of a search results data repository;
generating, by said processor based on results of said determining and comparing, a subset of search results of said search results data, wherein said subset of search results correlates to said at least one subject based intent classification exceeding a specified threshold, and wherein said subset of search results is generated with respect to a context of said domain specific search query, a location of said domain specific search query, said at least one subject based intent classification, a variation of words of said domain specific search query, synonyms of said domain specific search query, concept matching results of said domain specific search query, and natural language queries associated with said domain specific search query;
ranking, by said processor, said subset of search results resulting in a ranked list of said subset of search results, said subset of search results comprising alternative words and phrases differing from any words and phrases of said search phrase, wherein said generating said subset and said ranking results in an improvement of Internet based search accuracy by understanding user intent in combination with a contextual meaning of terms as they appear within a searchable Internet data space for generation of more relevant Internet search results;
triggering, by said processor based on said at least one subject based intent classification, an action enabling a request to be directed to a specified Internet location;
presenting, by said processor via a second graphical user interface, a specified search phrase of said search phrases in a first results portion of said second graphical user interface, said specified search phrase and an associated number of results in a second results portion of said second graphical user interface, and results specifying a top sematic intent and an associated confidence percentage level in a third results portion of said second graphical user interface, wherein said first results portion differs from said second results portion and said third results portion; and
deploying, integrating, and maintaining, by said computer processor based on execution of firmware instructions with respect to said Internet search query technology improvement method, said specialized hardware device comprising said NLC circuit including a programmable logic array configured to execute specialized software for personalizing said NLC circuit thereby resulting in a performance of said special purpose hardware system being configured for improving said Internet based search accuracy for execution of said Internet search query technology improvement method.

9. The computer program product of claim 8, wherein said method further comprises:
generating, by said processor based on results of said determining and comparing, confidence scores associated with confidence factors with respect to said at least one subject based intent classification, wherein said ranking is further based on said confidence scores.

10. The computer program product of claim 9, wherein said presenting further comprises presenting said confidence scores with said ranking list.

11. The computer program product of claim 8, wherein said query is associated with a specified domain specific corpus with respect to said content corpus.

12. The computer program product of claim 8, wherein said generating said Intent domain comprises:
analyzing said content corpus; and
determining similarities within said content corpus.

13. The computer program product of claim 8, wherein said analyzing comprises:
matching keywords;
matching a high frequency of keywords and associated tags;
matching words illustrated within headings; and
matching results of a comparison process with respect to additional content.

14. A hardware device comprising a processor coupled to a computer-readable memory unit, said memory unit comprising instructions that when executed by the processor executes an Internet search query technology improvement method comprising:
generating, by said processor enabling a natural language classifier (NLC) circuit of a specialized hardware device comprising special purpose hardware and computer instructions, an intent domain associated with at least one subject based intent classification, wherein said at least one subject based intent classification is defined within a ground truth for said intent domain, and wherein said NLC circuit comprises embedded specialized non-generic analog, digital, and logic based circuitry of said specialized hardware device for executing specialized software for only performing said Internet search query technology improvement method;
tagging, by said processor, said at least one subject based intent classification with respect to a relevancy associated with said intent domain;
continuously executing, by said processor enabling said NLC circuit, an unstructured data analysis process with respect to a content corpus being associated with said at least one subject based intent classification, wherein said unstructured data analysis process comprises an extraction process consisting of a keyword extraction process, an image extraction process, a personality extraction process, a tone extraction process, and a relationship extraction process;
analyzing, by a processor enabling said NLC circuit, a search phase entered in a search field of a first graphical user interface with respect to a domain specific search query for specified subject matter;
presenting, by said processor via said first graphical user interface, said search phrase and an associated number of results in a first results portion of said first graphical user interface, first results specifying a top sematic intent and an associated confidence percentage level in a second results portion of said first graphical user interface, and a policy statement associated with said search phrase in a third portion of said first graphical user interface;
determining, by said processor executing said NLC circuit with respect to results of said analyzing, that said at least one subject based intent classification is associated with said search query;
comparing, by said processor, said at least one subject based intent classification to search results data of a search results data repository;
generating, by said processor based on results of said determining and comparing, a subset of search results of said search results data, wherein said subset of search results correlates to said at least one subject based intent classification exceeding a specified threshold, and wherein said subset of search results is generated with respect to a context of said domain specific search query, a location of said domain specific search query, said at least one subject based intent classification, a variation of words of said domain specific search query, synonyms of said domain specific search query, concept matching results of said domain specific search query, and natural language queries associated with said domain specific search query;
ranking, by said processor, said subset of search results resulting in a ranked list of said subset of search results, said subset of search results comprising alternative words and phrases differing from any words and phrases of said search phrase, wherein said generating said subset and said ranking results in an improvement of Internet based search accuracy by understanding user intent in combination with a contextual meaning of terms as they appear within a searchable Internet data space for generation of more relevant Internet search results;
triggering, by said processor based on said at least one subject based intent classification, an action enabling a request to be directed to a specified Internet location;
presenting, by said processor via a second graphical user interface, a specified search phrase of said search phrases in a first results portion of said second graphical user interface, said specified search phrase and an associated number of results in a second results portion of said second graphical user interface, and results specifying a top sematic intent and an associated confidence percentage level in a third results portion of said second graphical user interface, wherein said first results portion differs from said second results portion and said third results portion; and
deploying, integrating, and maintaining, by said computer processor based on execution of firmware instructions with respect to said Internet search query technology improvement method, said specialized hardware device comprising said NLC circuit including a programmable logic array configured to execute specialized software for personalizing said NLC circuit thereby resulting in a performance of said special purpose hardware system being configured for improving said Internet based search accuracy for execution of said Internet search query technology improvement method.

15. The hardware device of claim 14, wherein said method further comprises:
generating, by said processor based on results of said determining and comparing, confidence scores associated with confidence factors with respect to said at least one subject based intent classification, wherein said ranking is further based on said confidence scores.

16. The hardware device of claim 15, wherein said presenting further comprises presenting said confidence scores with said ranking list.

17. The hardware device of claim 14, wherein said query is associated with a specified domain specific corpus with respect to said content corpus.

* * * * *